US010707732B2

(12) United States Patent
Uda et al.

(10) Patent No.: US 10,707,732 B2
(45) Date of Patent: Jul. 7, 2020

(54) MANUFACTURING JIG FOR STATOR (71) Applicant: HONDA MOTOR CO., LTD., Tokyo (JP)

(72) Inventors: Yumi Uda, Tochigi (JP); Satoru Ichihashi, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 86 days.

(21) Appl. No.: 15/459,644

(22) Filed: Mar. 15, 2017

(65) Prior Publication Data
US 2017/0271965 A1 Sep. 21, 2017

(30) Foreign Application Priority Data

Mar. 17, 2016 (JP) .................................. 2016-054045

(51) Int. Cl.
H02K 15/12 (2006.01)
H02K 15/14 (2006.01)
H02K 15/02 (2006.01)

(52) U.S. Cl.
CPC ............ H02K 15/12 (2013.01); H02K 15/02 (2013.01); H02K 15/14 (2013.01)

(58) Field of Classification Search
CPC ........ H02K 15/12; H02K 15/10; H02K 15/14; Y10T 29/53143
See application file for complete search history.

(56) References Cited

U.S. PATENT DOCUMENTS 3,355,310 A * 11/1967 De Jean ................. H02K 15/12
427/104
6,759,785 B2 * 7/2004 Miyake .................... H02K 1/14
310/254.1
7,185,418 B2 * 3/2007 Miyake .................... H02K 1/14
29/596

(Continued)

FOREIGN PATENT DOCUMENTS

CN 101627526 1/2010
JP 60-074417 4/1985

(Continued)

OTHER PUBLICATIONS

Japanese Office Action dated Oct. 3, 2017, 2 pages.
Chinese Office Action dated Oct. 17, 2018, 7 pages.

Primary Examiner — Peter Dungba Vo
Assistant Examiner — Jeffrey T Carley
(74) Attorney, Agent, or Firm — Rankin, Hill & Clark LLP (57) ABSTRACT A manufacturing jig for a stator, the stator including a substantially annular stator core and electrical conductors. The stator core is formed by stacking, in layers, a plurality of thin plates where a plurality of fastening holes are formed in a vicinity of a circumferential edge portion so that the fastening holes are aligned in the stacking direction. The electrical conductors are partially inserted into a plurality of slots formed in the stator core. The manufacturing jig is attached to the stator core when a powder resin is applied to the electrical conductors and includes hole portions. The hole portions are arranged being divided in a circumferential by being divided in a circumferential direction of the stator core, cover the fastening holes and a vicinity thereof from above, and are formed so as to be able to be fastened to the fastening holes of the stator core.

8 Claims, 5 Drawing Sheets (56) References Cited

U.S. PATENT DOCUMENTS

| | | | |
|---|---|---|---|
| 8,344,298 B2 * | 1/2013 | Koide | H02K 15/12 |
| | | | 219/636 |
| 2005/0050714 A1 * | 3/2005 | Hashimoto | H02K 15/02 |
| | | | 29/596 |
| 2006/0238059 A1 * | 10/2006 | Komatsu | H02K 1/14 |
| | | | 310/162 |
| 2010/0320194 A1 | 12/2010 | Koide et al. | |
| 2011/0000079 A1 * | 1/2011 | Fukumaru | H02K 1/2766 |
| | | | 29/598 |
| 2012/0146434 A1 * | 6/2012 | Nonaka | H02K 1/148 |
| | | | 310/43 |
| 2013/0162072 A1 * | 6/2013 | Mizutani | H02K 3/522 |
| | | | 310/71 |

FOREIGN PATENT DOCUMENTS

| | | |
|---|---|---|
| JP | 2008-193875 | 8/2008 |
| JP | 2012-110190 | 6/2012 |
| JP | 2012-240254 | 12/2012 |

* cited by examiner

MANUFACTURING JIG FOR STATOR

CROSS REFERENCE TO RELATED APPLICATIONS

This application is based on and claims the benefit of priority from Japanese Patent Application No. 2016-054045, filed on 17 Mar. 2016, the content of which is incorporated herein by reference.

TECHNICAL FIELD

The present invention relates to a method of manufacturing a stator and a manufacturing jig for the stator.

BACKGROUND ART

Conventionally, rotating electric machines, such as an electric motor and a generator, which include a stator and a rotor, are known. The stator of a rotating electric machine is generally manufactured as follows. While a plurality of substantially annular steel plates are first stacked in layers so as to produce a stator core, a plurality of coil elements which are formed substantially in the shape of a letter U by bounding a plurality of electrical conductors are produced. Then, the produced coil elements are aligned annularly while being overlaid in a circumferential direction, and in this state, the tip end portions of the electrical conductors are inserted through slots aligned annularly in the stator core. Then, the tip end portions of the electrical conductors which are protruded from the slots are twisted in a circumferential direction, and are thereafter joined together. Then, parts of the surfaces of the electrical conductors exposed from the slots are coated with a resin, and thus insulation processing is performed. In this way, the stator of a rotating electric machine is manufactured.

Incidentally, the insulation processing described above is performed by heating the stator core by induction heating and then coating the electrical conductors heated to a high temperature with a powder resin. However, the steel plates are affected by magnetic field lines produced at the time of heating, thus magnetic levitation occurs, the heat is not transmitted to lower layers below the levitated layer and only the levitated steel plates are overheated, with the disadvantageous result that, for example, the heat-resistant temperature of insulating paper is exceeded or that the steel plates are thermally deformed. Hence, as a method of mitigating the curving and the magnetic levitation of the steel plates, a method of arranging on the steel plates a holding plate formed with an annular nonmagnetic member (see, for example, patent document 1) and a method of installing a weight on the steel plates (see, for example, patent document 2) are proposed.

On the other hand, in the stator core, a plurality of fastening holes for fixing the steel plates stacked in layers are provided. Hence, when a resin is applied, a foreign substance such as a powder resin or varnish may be adhered to the surrounding of these fastening holes such that a fastening surface is not brought into close contact with a washer and thus a problem may occur in a fastening operation. Hence, conventionally, an operator covers the vicinity of the fastening holes with masking tape, and in this state, the coating of the resin is performed.

Patent Document 1: Japanese Unexamined Patent Application, Publication No. 2012-240254

Patent Document 2: Japanese Unexamined Patent Application, Publication No. S60-74417

DISCLOSURE OF THE INVENTION

Problems to be Solved by the Invention

However, with conventional technology, the operator needs to perform, for the insulation processing, two operations which are the operation of installing the holding plate on the stator core and the operation of affixing the masking tape, with the result that the operation steps are complicated.

The present invention is made in view of the foregoing problem, and an object thereof is to provide a method of manufacturing a stator which can prevent the magnetic levitation of steel plates caused during induction heating and which can prevent the adherence or entrance of a powder resin, varnish and the like to the vicinity of fastening holes, and a manufacturing jig for the stator.

Means for Solving the Problems (1) A method of manufacturing a stator (for example, a method S1 of manufacturing a stator which will be described later) that includes: a substantially annular stator core (for example, a stator core 2 which will be described later) which is formed by stacking, in layers, a plurality of thin plates (for example, steel plates 20 which will be described later) where a plurality of fastening holes (for example, fastening holes 27 which will be described later) are formed in the vicinity of a circumferential edge portion such that the fastening holes are aligned in the stacking direction; and electrical conductors (for example, electrical conductors 3A which will be described later) which are partially inserted into a plurality of slots (for example, slots 2A which will be described later) formed in the stator core, the method of manufacturing a stator including: an attachment step (for example, an attachment step S2 which will be described later) of attaching, to the stator core, holding members which cover the fastening holes and the vicinity thereof from above and which hold the stator core to an inner side in the stacking direction; a heating step (for example, a heating step S3 which will be described later) of heating the stator core by induction heating; a coating step (for example, a resin coating step S4) of coating the electrical conductors heated in the heating step with a resin; and a removal step (for example, a removal step S5 which will be described later) of removing the holding members from the stator core after the coating step.

In the manufacturing method according to the invention of the above (1), the attachment step is first provided in which the holding member that covers the fastening holes and the vicinity thereof from above and that holds the stator core to the inner side in the stacking direction is attached to the stator core. Then, the heating step and the resin coating step are provided, the stator core is heated by induction heating and then the electrical conductors are coated with the resin. Thereafter, the removal step is provided, the holding member is removed from the stator core subjected to the insulation processing and thus a stator which can be attached to a rotating electric machine is formed.

In this way, in the invention of (1), with the holding member attached to the stator core, it is possible to prevent the magnetic levitation of the steel plates which can be caused during induction heating and the resulting curving of the steel plates, and in the resin coating step, with the holding member, it is possible to prevent the adherence of the resin, varnish and the like to the fastening holes and the vicinity thereof. Since the preparation for the coating of the electrical conductors with the resin is completed only by attaching the holding member, the efficiency of the operation is enhanced, and the removed holding member can be reused.

(2) The method of manufacturing a stator according to the above (1), where the holding members are arranged by being divided in a circumferential direction of the stator core.

In the method of manufacturing a stator according to the above (2), in the method of manufacturing a stator according to the above (1), in particular, the holding members are arranged by being divided in a circumferential direction of the stator core.

In this way, the holding members can be individually removed, and even if a stator constituent member (for example, a three-phase line) is connected after the holding members are attached, the holding members can be removed. Even if one holding member is deformed by thermal expansion, the influence of the deformation is not transmitted to other holding members, and thus it is possible to prevent the deformation of the holding members.

(3) The method of manufacturing a stator according to the above (1) or (2), where in the attachment step, hole portions formed in the holding members and the fastening holes of the stator core are fastened with the same fastening members (for example, bolts 60 which will be described later) such that the stator core is held to the inner side in the stacking direction.

In the method of manufacturing a stator according to the above (3), in the method of manufacturing a stator according to the above (1) or (2), in particular, the hole portions included in the holding members and the fastening holes of the stator core are fastened with the same fastening members.

In this way, the holding member can be attached integrally to the stator core. Hence, the stator core is easily transported at the time of, for example, transition between individual steps, the fastening member is prevented from being loosened and thus it is possible to reliably prevent the adherence of the powder resin to the vicinity of the fastening holes.

(4) A manufacturing jig (for example, a holding member 50 which will be described later) for a stator (for example, a stator 1 which will be described later) that includes: a substantially annular stator core (for example, a stator core 2 which will be described later) which is formed by stacking, in layers, a plurality of thin plates (for example, steel plates 20 which will be described later) where a plurality of fastening holes (for example, fastening holes 27 which will be described later) are formed in the vicinity of a circumferential edge portion such that the fastening holes are aligned in the stacking direction; and electrical conductors (for example, electrical conductors 3A which will be described later) which are partially inserted into a plurality of slots (for example, slots 2A which will be described later) formed in the stator core, wherein the stator includes hole portions which are arranged by being divided in a circumferential direction of the stator core, which cover the fastening holes and the vicinity thereof from above and which are formed so as to be able to be fastened to the fastening holes of the stator core.

In particular, the manufacturing jigs for a stator according to the above (4) are provided so as to cover, from above, the substantially annular stator core which is formed by stacking a plurality of plates in layers such that a plurality of fastening holes are aligned in the stacking direction. In this way, with the manufacturing jigs, it is possible to prevent the magnetic levitation of the steel plates which can be caused during induction heating and the resulting curving of the steel plates, and the manufacturing jigs are used as the masking member, and thus it is possible to prevent the adherence of the resin, varnish and the like to the fastening holes and the vicinity thereof.

The manufacturing jigs for a stator according to the above (4) can be fastened to the fastening holes of the stator core, and are formed by being divided in a circumferential direction of the stator core. In this way, even if a stator constituent member (for example, a three-phase line) is connected after the manufacturing jigs are attached, the manufacturing jigs can be removed. Even if one manufacturing jig is deformed by thermal expansion, the influence of the deformation is not transmitted to other manufacturing jigs, and thus it is possible to prevent the deformation of the manufacturing jigs.

Effects of the Invention

According to the present invention, it is possible to provide a method of manufacturing a stator which can prevent the magnetic levitation of steel plates caused during induction heating and which can prevent the adherence or entrance of a powder resin, varnish and the like to the vicinity of fastening holes, and a manufacturing jig for the stator.

PREFERRED MODE FOR CARRYING OUT THE INVENTION

An embodiment of the present invention will be described in detail below with reference to drawings. In the following description, it is assumed that the side where the top portion of an electrical conductor is arranged is the upper side, and that the side where the bottom portion of the electrical conductor is the lower side. In a method of manufacturing a stator according to the present embodiment, in a state where an attachment member is attached to a stator core, the electrical conductor is coated with an insulating resin, and thus the stator is manufactured.

The stator 1 which is manufactured by the manufacturing method according to the present invention will first be described.

Figure 1:
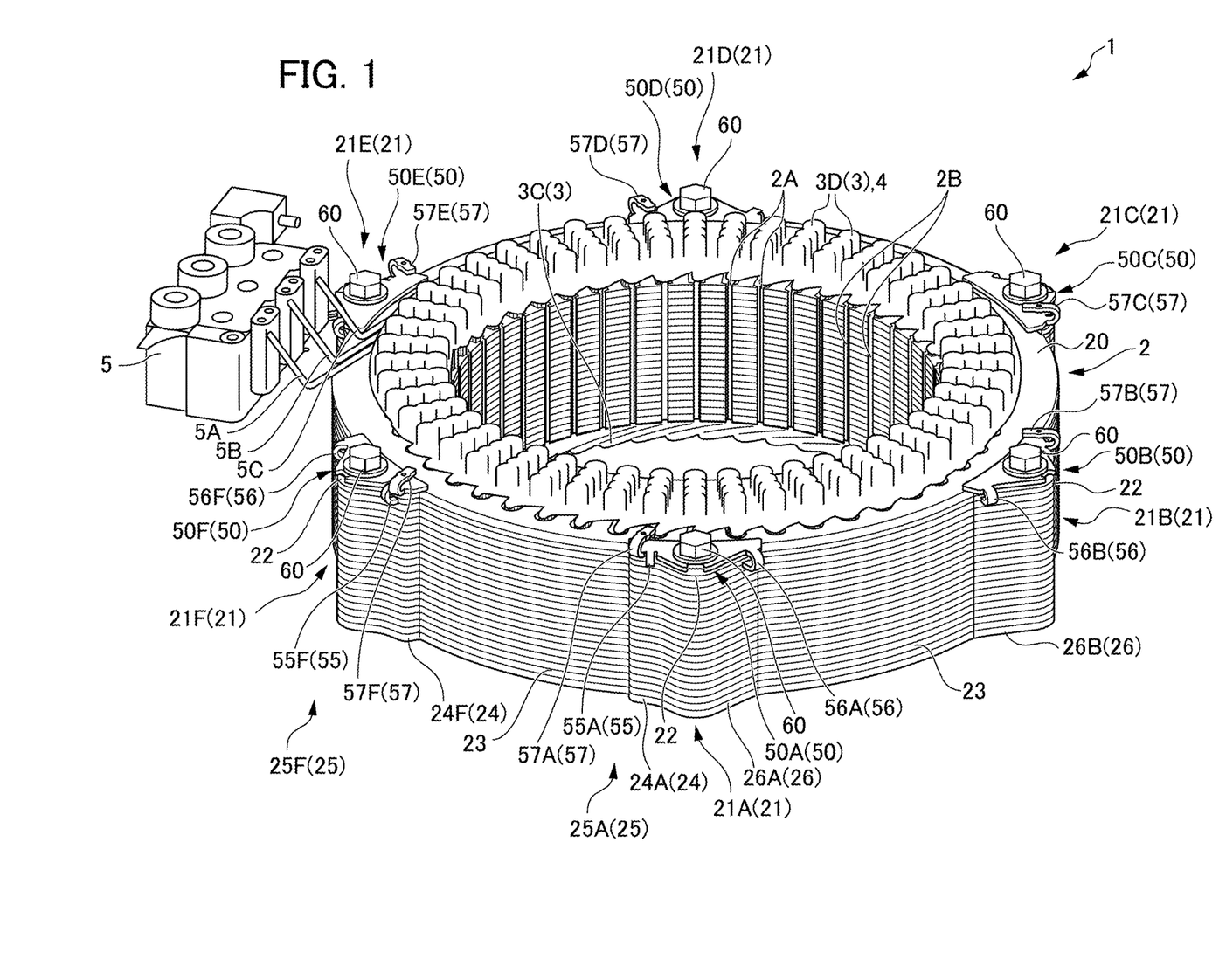
FIG. 1 is a perspective view showing the configuration of a stator according to an embodiment of the present invention.
Figure 2:
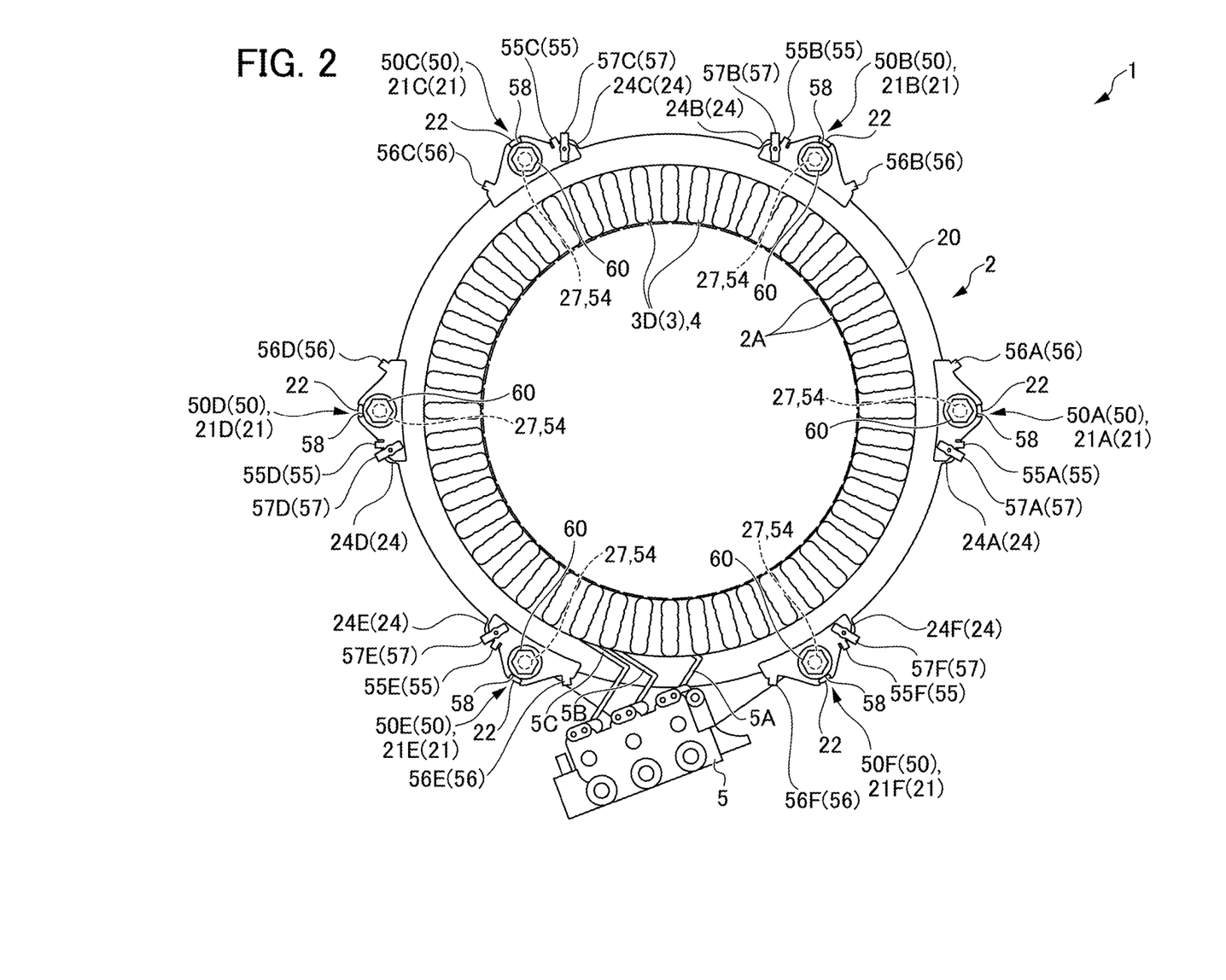
FIG. 2 is a plan view of the stator according to the present embodiment.
Figure 3:
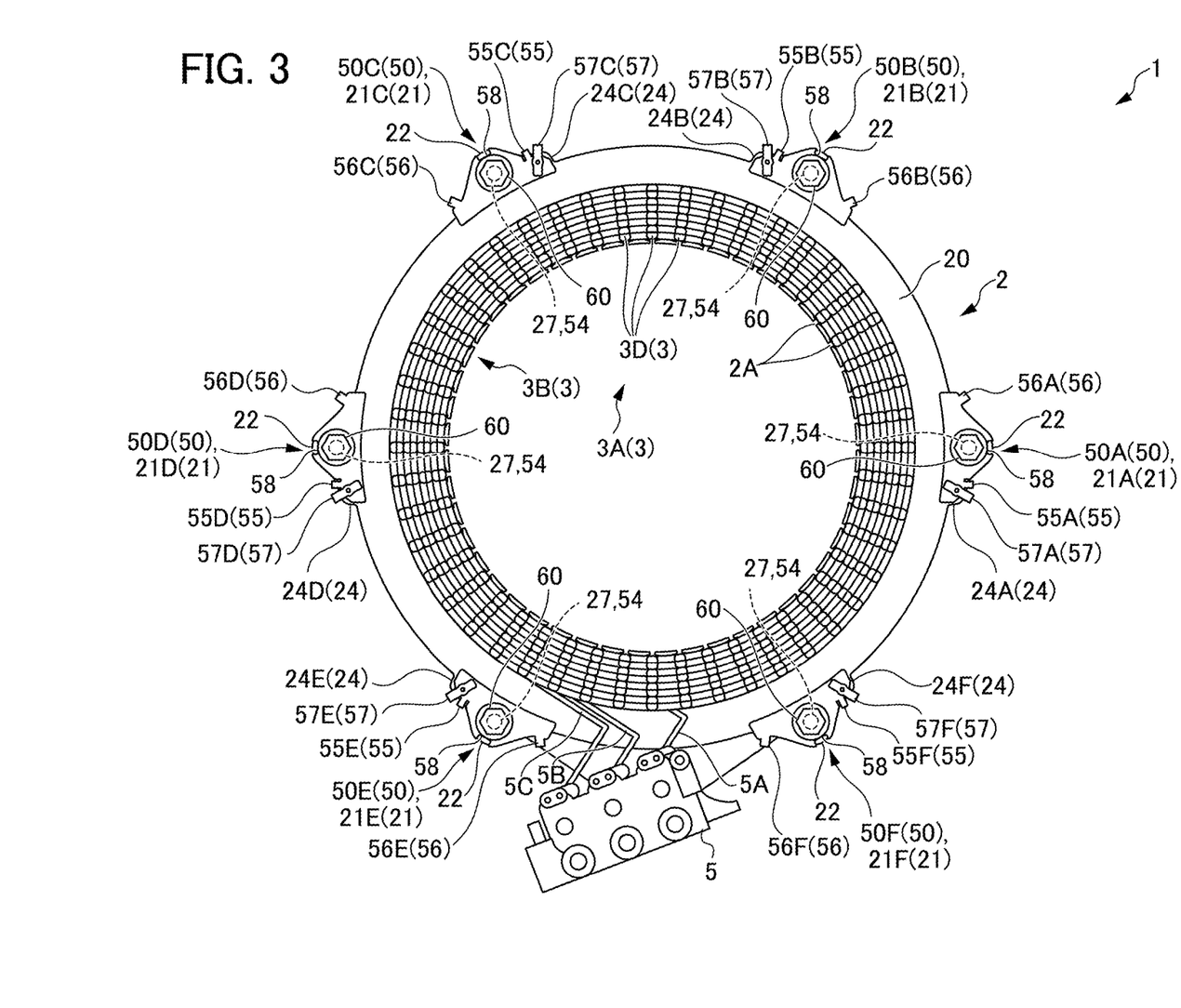
FIG. 3 is a plan view of the stator before the coating of a resin according to the present embodiment.

FIG. 1 is a perspective view showing the configuration of the stator according to the embodiment of the present invention. FIG. 2 is a plan view of the stator 1. FIG. 3 is a plan view of the stator 1 before the coating of the resin according to the present embodiment.

The stator 1 is formed substantially annularly, and is configured so as to include the stator core 2, a coil 3, resin 4 and holding members (manufacturing jig for the stator 1) 50. Inside the stator 1, an unillustrated rotor is rotatably arranged. An inner coil and an outer coil for performing induction heating on the stator core 2 which are not shown in the figure are arranged on the inner circumference and the outer circumference of the stator core 2 so as to sandwich the stator core 2.

The stator core 2 is formed substantially annularly. In the inner circumference of the stator core 2, a plurality of slots 2A which penetrate in the direction of the center axis of the stator core 2 are provided at regular intervals.

The slot 2A is formed such that its cross-sectional shape in the radial direction of the stator core 2 is extended radially from the inner circumferential edge of the stator core toward the outer side in the radial direction. The slots 2A communicate with slits 2B which are formed on the inner circumferential surface of the stator core 2 in a circumferential direction at regular intervals and which are extended in the direction of a rotating shaft.

The stator core 2 is formed by stacking, in layers, a plurality of steel plates 20 which have six protrusion portions 21 (21A to 21F) that are protruded outward. These six protrusion portions 21 are formed in a circumferential direction at regular intervals.

In the side surface of the six protrusion portions 21 (21A to 21F) in a horizontal direction, first curved portions 25 (25A to 25F) where convex portions 24 (24A to 24F) are formed between the tip end portions 22 of the protrusion portions 21 and the skirt portions 23 of the protrusion portions 21 and second curved portions 26 (26A to 26F) which are curved from the tip end portions 22 of the protrusion portions 21 to the skirt portions 23 of the protrusion portions 21 are provided.

When the three protrusion portions 21A, 21C and 21E are seen from the outer side to the inner side in the radial direction of the stator core 2, the first curved portions 25 (25A, 25C and 25E) are formed on the left side whereas in the three protrusion portions 21B, 21D and 21F, the first curved portions 25 (25B, 25D and 25F) are formed on the right side. In this way, between the two adjacent protrusion portions 21, the first curved portions 25 of each other or the second curved portions 26 of each other are arranged.

In the vicinity of the center portion of the protrusion portions 21, fastening holes 27 are formed which penetrate in the up/down direction of the steel plates 20 and in which bolts can be fastened. In the fastening holes 27, after the removal of the holding members 50, unillustrated fastening members are inserted therethrough and are fastened.

The coil 3 is formed with a plurality of coil elements 3B which are formed by bundling a plurality of electrical conductors 3A substantially in the shape of a letter U. The top portion 3C of the coil 3 is formed substantially in the shape of a letter S in a plan view.

The coil 3 is inserted through the slots 2A in a state where the coil elements 3B are aligned annularly while overlapping each other in a circumferential direction. In the lower portion of the coil elements 3B, connection portions 3D are formed in which the lower end portions of the electrical conductors 3A aligned at predetermined intervals are connected to each other such as by TIG welding. The connection portions 3D are coated with the resin 4 for insulation.

The resin 4 is formed of an insulating resin material which has a powder form or a liquid form before the coating. The resin 4 is applied onto the connection portions 3D of the coil 3 and is formed by being heated and cured. In the present embodiment, a resin 4 having a powder form is used.

An energization heating device 5 has three power supply lines 5A to 5C, and the supply lines are electrically connected to the connection portions 3D of the coil elements 3B. The energization heating device 5 outputs an alternating current whose initial phase is individually shifted by one third of its wavelength from the three supply lines.

Figure 4:
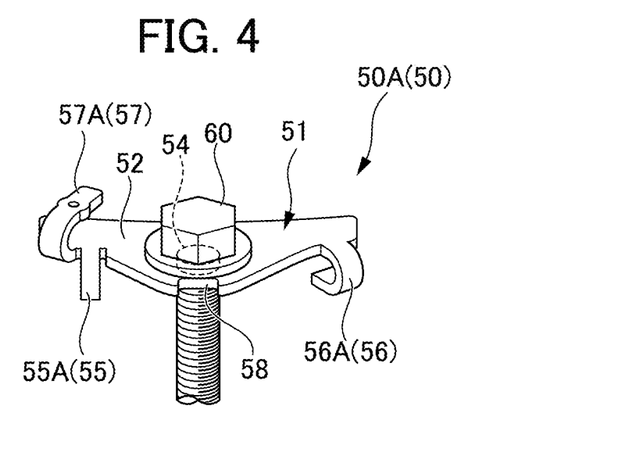
FIG. 4 is a perspective view showing a first holding member according to the present embodiment.
Figure 5:
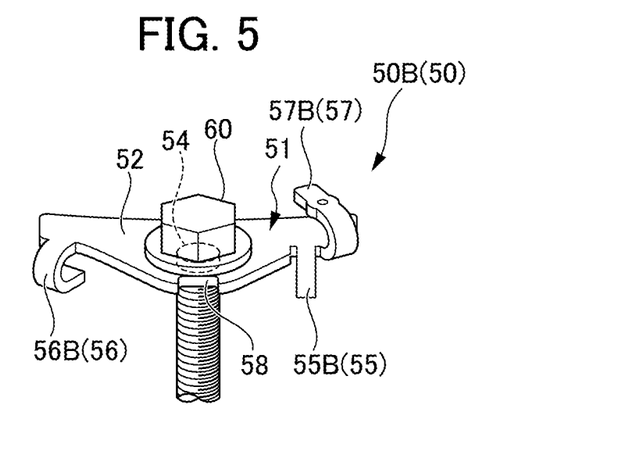
FIG. 5 is a perspective view showing a second holding member according to the present embodiment.
Figure 6:
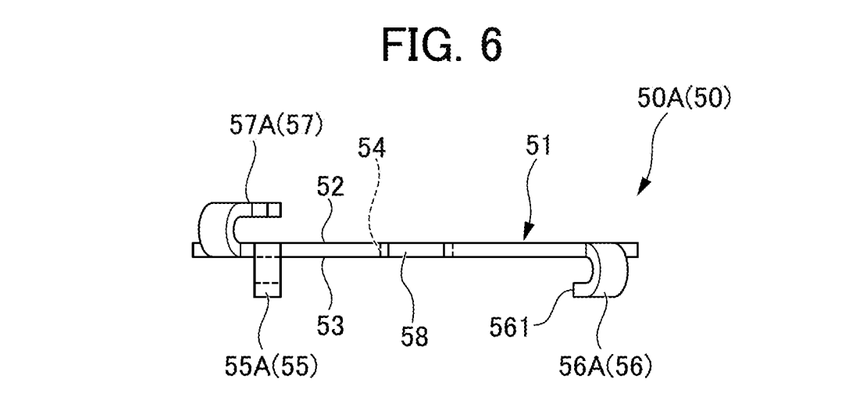
FIG. 6 is a front view showing the first holding member according to the present embodiment.
Figure 7:
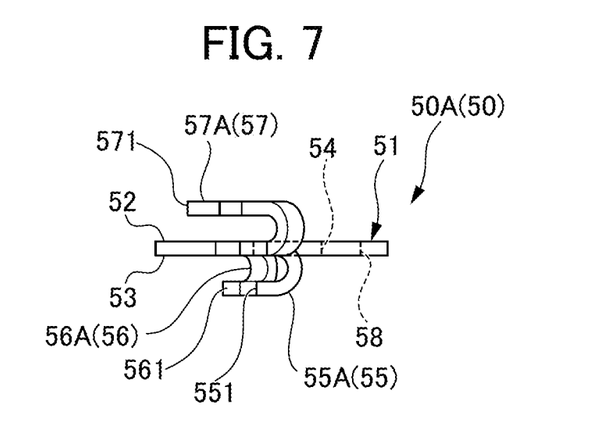
FIG. 7 is a left side view showing the first holding member of FIG. 6.

The holding member 50 will be described in detail with reference to FIGS. 4 to 7. Here, FIG. 4 is a perspective view of a first holding member 50A according to the present embodiment. FIG. 5 is a perspective view of a second holding member 50B according to the present embodiment. FIG. 6 is a front view of the first holding member 50A according to the present embodiment. FIG. 7 is a left side view of the first holding member 50A of FIG. 6.

As shown in FIGS. 4 and 5, the holding member 50 is configured so as to include a fastening hole (hole portion) 54, a bolt (fastening member) 60 and an unillustrated nut. The holding member 50 is fastened with the bolt 60 and the nut in a state where the fastening hole 54 is made to communicate with the fastening hole 27 of the protrusion portion 21. The holding member 50 prevents the magnetic levitation of the steel plates 20 at the time of induction heating and the resulting curving of the steel plates. Although the fastening is performed with a nut here, a pallet in which a female screw is cut may be used instead of the nut.

In the main body portion 51 of the holding member 50, the first holding member 50A, 50C or 50E (in FIG. 4, the first holding member 50A) which has a shape suitable for the protrusion portion 21A, 21C or 21E and the second holding member 50B, 50D or 50F (in FIG. 5, the second holding member 50B) which has a shape suitable for the protrusion portion 21B, 21D or 21F are formed. As the material of the main body portion 51, a nonmagnetic material such as stainless steel is used.

The front surface portion 52 of the main body portion 51 is coated such that a resin, varnish or the like adhered thereto can be easily removed. The back surface portion 53 of the main body portion 51 is formed to have a flatness of 0.1 or less such that a resin powder is prevented from entering a gap between the back surface portion 53 and the protrusion portion 21.

In the main body portion 51, the fastening hole (hole portion) 54, a first rotation prevention portion 55, a second rotation prevention portion 56, an up/down and left/right discrimination portion 57 and a measurement notch portion 58 are provided.

The first rotation prevention portion 55 (55A to 55F) and the second rotation prevention portion 56 (56A to 56F) cancel a stress received from the bolt 60 when the holding member 50 is attached, and thus the rotation of the main body portion 51 is prevented (in FIG. 4, the first rotation prevention portion 55A and the second rotation prevention portion 56A).

The first rotation prevention portion 55 is provided on the side of the first curved portions 25. The first rotation prevention portion 55 is extended from the main body portion 51 outward in the radial direction of the stator core 2, and then the tip end portion 551 of the first rotation prevention portion 55 is bent downward so as to make contact with part of the convex portion 24 shown in FIG. 1.

The second rotation prevention portion 56 is provided on the side of the second curved portions 26. After being extended from the main body portion 51 outward in the radial direction of the stator core 2, the tip end portion 561 of the second rotation prevention portion 56 is bent downward so as to make contact with part of the second curved portions 26.

The up/down and left/right discrimination portion 57 (57A to 57F) is provided on the side of the first rotation prevention portion 55 (in FIG. 4, the up/down and left/right discrimination portion 57A). The up/down and left/right discrimination portion 57 is extended from the main body portion 51 outward in the radial direction of the stator core 2, and then the tip end portion 571 of the up/down and left/right discrimination portion 57 is bent so as to be arranged above the main body portion 51.

The up/down and left/right discrimination portion 57 makes it easy to discriminate the consistency of the shape of the protrusion portion 21 and the shape of the main body portion 51.

The measurement notch portion 58 is provided to have such an area that laser light can be applied onto the tip end portion 22 of the protrusion portion 21. The measurement notch portion 58 is utilized when the height from the lower surface of the stator core 2 to the upper surface is measured with an unillustrated laser measuring device. The measurement notch portion 58 can also be used for a mechanical measuring device such as a micro gauge.

A method S1 of manufacturing the stator 1 which has the above configuration will be described below.

The method S1 of manufacturing the stator 1 according to the present embodiment is configured so as to include an attachment step S2, a heating step S3, a resin coating step S4 and a removal step S5.

In the attachment step S2, the holding member 50 is attached to the upper surface of each of the protrusion portions 21 in the stator core 2. Specifically, the up/down and left/right discrimination portion 57 is first used to arrange the holding member 50 suitable for the shape of the protrusion portion 21, and the fastening hole 54 of the holding member 50 is made to communicate with the fastening hole 27 of the protrusion portion 21. The bolt 60 is inserted through the fastening holes which are made to communicate with each other, and the end portion of the bolt 60 is fastened with the nut, with the result that the holding member 50 is formed integrally with the stator core 2.

In the heating step S3, the coil 3 is heated by energization heating, and the stator core 2 is heated by induction heating. Specifically, by a current applied with the energization heating device 5, joule heat based on electrical resistance within the coil 3 is generated, and thus the coil 3 is heated. Due to a current being applied to the inner coil and outer coil which are not shown in the figure and which are arranged on the inner circumference and the outer circumference of the stator core so as to sandwich the stator core, an induced current flows through the stator core and thus heat is generated. Here, although the temperature is increased and magnetic field lines are produced, the deformation and the levitation of the steel plates 20 in the stator core 2 are reduced. Here, although in the heating step S3, in order for the heating time to be reduced, energization heating for heating the coil and induction heating for heating the stator core are performed together, when there are no time constraints, only induction heating for heating the stator core may be performed.

In the resin coating step S4, the connection portions 3D of the coil 3 are coated with the resin 4. Specifically, the connection portions 3D of the coil 3 heated in the heating step S3 are put into the unillustrated storage chamber of the resin 4, and the resin powder is melted and adhered by the heat of the coil 3. Thereafter, the stator core 2 is put into a furnace, and the resin is fixedly adhered to the coil 3.

Here, the joint fastening holes are masked by the holding member 50, and the resin, varnish and the like are prevented from being adhered to the vicinity of the fastening holes. In the resin coating step S4, a step of coating the top portion of the coil 3 with the resin may be provided. Even in this case, the resin flowing from the top portion is prevented from being adhered to the vicinity of the fastening holes.

In the removal step S5, the holding member 50 is removed from the stator core 2. Specifically, the holding member 50 can only be removed by removing the nut attached to the bolt 60. Here, when a conventional annular holding member is used, after the holding member is attached, by the interference of a member which is attached to the stator core, for example, a three-phase line or the like, it is impossible to remove the holding member. However, since the holding members 50 of the present invention are divided in a circumferential direction, the holding members 50 can be individually removed without the interference of the three-phase line or the like.

Between the steps S2 to S5, other steps such as a step of attaching another component to the stator core and a step of connecting the coils together may be performed.

In the method S1 of manufacturing the stator 1 according to the present embodiment, the following effects are achieved.

The attachment step S2 is first provided in which the holding member 50 is attached from above the stator core 2 so as to cover the fastening holes 27 and the vicinity thereof. Then, the heating step S3 and the resin coating step S4 are provided, the electrical conductors 3A are heated and then the electrical conductors 3A are coated with the resin 4. Thereafter, the removal step S5 is provided, the holding member 50 is removed from the stator core 2 subjected to the insulation processing and thus the stator 1 which can be attached to a rotating electric machine is formed.

In this way, in the present embodiment, with the holding member 50 attached to the stator core 2, it is possible to prevent the magnetic levitation of the steel plates 20 which can be caused during induction heating and the resulting curving of the steel plates, and in the resin coating step, with the holding member 50, it is possible to prevent the adherence of the resin, varnish and the like to the fastening holes 27 and the vicinity thereof.

Since the preparation for the coating of the electrical conductors 3A with the resin is completed only by attaching the holding member 50, the efficiency of the operation is enhanced, and the removed holding member can be reused.

In the present embodiment, the holding members 50 are divided and arranged in a circumferential direction of the stator core 2.

In this way, the holding members 50 can be individually removed, gaps on the circumference of the stator core 2 between the holding members 50 are utilized and thus an energization heating device 5 or the like can be attached to and removed from the stator core 2. Even if one holding member 50 is deformed by thermal expansion, the influence of the deformation is not transmitted to the adjacent holding members 50, and thus it is possible to prevent the deformation of the holding members 50.

In the present embodiment, the hole portion (fastening hole) 54 included in the holding member 50 and the fastening hole 27 of the stator core 2 are fastened with the same fastening member (bolt) 60.

In this way, the holding member 50 can be attached integrally to the stator core 2. Hence, the stator core 2 is easily transported at the time of, for example, transition between individual steps, the fastening member 60 is prevented from being loosened and thus it is possible to reliably prevent the adherence of the resin to the fastening holes 27.

In the present embodiment, the manufacturing jigs (holding members) 50 are provided so as to cover, from above, the substantially annular stator core 2 which is formed by stacking a plurality of plates in layers such that a plurality of fastening holes 27 are aligned in the stacking direction. In this way, with the manufacturing jigs 50, it is possible to prevent the magnetic levitation of the steel plates which can be caused during induction heating, and the manufacturing jigs 50 are used as the masking member, and thus it is possible to prevent the adherence of the resin, varnish and the like to the vicinity of the fastening holes.

The manufacturing jigs 50 can be fastened to the fastening holes 27 of the stator core 2, and are formed by being divided in a circumferential direction of the stator core 2. In this way, the manufacturing jigs 50 can be individually removed, and even if one manufacturing jig 50 is deformed by thermal expansion, the influence of the deformation is not transmitted to other manufacturing jigs 50, and thus it is possible to prevent the deformation of the manufacturing jigs 50.

The present invention is not limited to the embodiment described above, and variations and modifications which can achieve the object of the present invention are included in the present invention.

EXPLANATION OF REFERENCE NUMERALS

1: stator
2: stator core
2A: slot
3A: electrical conductor
4: resin
20: steel plate (thin plate)
27: fastening hole
50: holding member
51: main body portion
54: fastening hole (hole portion)
60: bolt (fastening member)

The invention claimed is:

1. A method of manufacturing a stator, the stator comprising:
a substantially annular stator core which is formed by stacking, in layers, a plurality of thin plates where a plurality of fastening holes are formed in a vicinity of a circumferential edge portion such that the fastening holes are aligned in a stacking direction; and
electrical conductors which are partially inserted into a plurality of slots formed in the stator core,
wherein the method of manufacturing the stator comprises:
an attachment step of attaching, to the stator core when a powder resin is applied to the electrical conductors, a plurality of holding members, each of the plurality of holding members being a different body from other of the plurality of holding members, the plurality of holding members being arranged separately from one another in a circumferential direction of the stator core, and the plurality of holding members respectively covering the fastening holes and a vicinity thereof from above in the stacking direction of the thin plates, and the plurality of holding members each have a hole which communicates with a respective fastening hole of the stator core following attachment of the plurality of holding members to the stator core, thus forming a corresponding pair comprising one fastening hole and one hole, the plurality of holding members attaching to the stator core by fastening by inserting a fastening member into each corresponding pair;
a heating step of heating the stator core by induction heating;
a coating step of coating the electrical conductors heated in the heating step with a resin; and
a removal step of removing the plurality of holding members from the stator core after the coating step.

2. The method of manufacturing a stator according to claim 1,
wherein in the attachment step, the holes of the plurality of holding members and the plurality of fastening holes of the stator core are fastened with same fastening members such that the stator core is held to the inner side in the stacking direction.

3. A manufacturing jig which is mounted to a stator prior to heating the stator and applying resin, the stator comprising:
a substantially annular stator core which is formed by stacking, in layers, a plurality of thin plates where a plurality of fastening holes are formed in a vicinity of a circumferential edge portion such that the fastening holes are aligned in a stacking direction; and
electrical conductors which are partially inserted into a plurality of slots formed in the stator core,
wherein the manufacturing jig comprises a plurality of holding members, each of the plurality of holding members being a different body from other of the plurality of holding members, the plurality of holding members being arranged separately from one another in a circumferential direction of the stator core, and the plurality of holding members respectively cover the fastening holes of the stator core and a vicinity thereof from above in the stacking direction of the thin plates, and the plurality of holding members each have a hole adapted to communicate with a respective one of the fastening holes of the stator core, thus forming a corresponding pair comprising one fastening hole and one hole, and
wherein the manufacturing jig is attached to the stator core by fastening by inserting a fastening member into each corresponding pair.

4. The manufacturing jig according to claim 3, wherein each of the plurality of holding members includes a rotation prevention portion which extends to abut a side face of the stator core.

5. The manufacturing jig according to claim 4, wherein the rotation prevention portion includes a first rotation prevention portion on a first side of the hole, and a second rotation preventing portion on a second side of the hole opposite to the first side of the hole.

6. The manufacturing jig according to claim 3, wherein each of the plurality of holding members is formed from a nonmagnetic member.

7. The manufacturing jig according to claim 3, wherein the plurality of holding members is adapted to be removed from the stator after applying the resin.

8. The manufacturing jig according to claim 7, wherein the plurality of holding members mask the plurality of fastening holes.

* * * * *